(12) United States Patent
Darbon et al.

(10) Patent No.: US 9,899,114 B2
(45) Date of Patent: Feb. 20, 2018

(54) LEAD-LOADED STRUCTURED SOLID ORGANIC SCINTILLATOR

(71) Applicant: Commissariat a l'Energie Atomique et aux Energies Alternatives, Paris (FR)

(72) Inventors: Stéphane Darbon, Paris (FR); Tony Caillaud, La Norville (FR); Adrien Rousseau, Etoillles (FR); Matthieu Hamel, Cherbourg (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/538,358

(22) PCT Filed: Dec. 18, 2015

(86) PCT No.: PCT/FR2015/053628
§ 371 (c)(1),
(2) Date: Jun. 21, 2017

(87) PCT Pub. No.: WO2016/102844
PCT Pub. Date: Jun. 30, 2016

(65) Prior Publication Data
US 2017/0352445 A1    Dec. 7, 2017

(30) Foreign Application Priority Data

Dec. 22, 2014 (FR) ...................................... 14 63152

(51) Int. Cl.
*G21K 4/00* (2006.01)
*C09K 11/06* (2006.01)
(Continued)

(52) U.S. Cl.
CPC .......... *G21K 4/00* (2013.01); *C08F 222/1006* (2013.01); *C08K 3/08* (2013.01);
(Continued)

(58) Field of Classification Search
CPC . G21K 4/00; C08K 3/08; C09K 11/06; C09K 2211/1018; C09K 2211/1425; C08F 222/1006; C08F 2222/1013
(Continued)

(56) References Cited

U.S. PATENT DOCUMENTS 4,495,084 A    1/1985    Shimizu et al.
4,788,436 A    11/1988   Koechner
(Continued)

FOREIGN PATENT DOCUMENTS

EP    0913448 A1    6/2003
FR    2555321 A1    5/1985
(Continued)

OTHER PUBLICATIONS

Bigler, E., Ploack, F., Applied Optics, vol. 24, N°7, 994-997.
(Continued)

*Primary Examiner* — David Porta
*Assistant Examiner* — Gisselle Gutierrez
(74) *Attorney, Agent, or Firm* — Brinks Gilson & Lione

(57) ABSTRACT

A scintillator for imaging using X-rays or gamma rays or charged particles, includes a network of glass capillaries with an inner diameter no greater than 500 micrometers. The capillaries are filled with a polymer material made up of at least: (i) a monomer selected from the group including vinyltoluene, styrene and vinylxylene and the isomers thereof, (ii) a cross-linking agent made up of a dimethacrylate having a central chain which includes 1 to 12 carbon atoms, and (iii) lead dimethacrylate. The cross-linking agent is provided to make up 17 wt % to 60 wt % of the mixture
(Continued)

thereof with the monomer, and the lead dimethacrylate makes up at least 5 wt %. The cross-linking agent is provided in a ratio of 1.75 to 2.25 times the weight content of the lead dimethacrylate.

12 Claims, 2 Drawing Sheets

(51) Int. Cl.
    *C08K 3/08*     (2006.01)
    *C08F 222/10*     (2006.01)

(52) U.S. Cl.
    CPC ...... *C09K 11/06* (2013.01); *C08F 2222/1013* (2013.01); *C09K 2211/1018* (2013.01); *C09K 2211/1425* (2013.01)

(58) Field of Classification Search
    USPC ...................................... 250/484.4
    See application file for complete search history.

(56) References Cited

U.S. PATENT DOCUMENTS

| | | | |
|---|---|---|---|
| 7,372,041 B1 | 5/2008 | Nagarkar et al. | |
| 2005/0161611 A1* | 7/2005 | Disdier | G01T 1/201 250/370.11 |
| 2013/0299742 A1* | 11/2013 | Hamel | C09K 11/06 252/301.18 |

FOREIGN PATENT DOCUMENTS

| | | |
|---|---|---|
| WO | WO2003/081279 A2 | 10/2003 |
| WO | WO2009/095376 A1 | 8/2009 |
| WO | WO2012/085004 A1 | 6/2012 |
| WO | WO2014/135640 A1 | 9/2014 |

OTHER PUBLICATIONS

Pichat, L., Pesteil, P., Clément, J. J., Chim. Phys. 1953, 50, 26-41.
M. Hamel, M., Turk, G., Rousseau, A., Darbon, S., Reverdin, C., Normand, S., Nucl. Instr. and Meth.A 660 (2011) 57-63.
Liang, Hao, et al., Spectrochim. Acta A 71 (2008) 588.
Riley, K. J.; Ovechkina, L.; Palamakumbura, S.; Bell, Z.; Miller, S.; Nagarkar, V. V. IEEE Nucl. Sci. Symp. Conf. Rec. 2010, 1777-1780.
Disdier, L., Lerche, R.A., Bourgade, J.L., Glebov, V.Yu., R.S.I. 75, 6, 2004.
C. Fourment et al., R.S.I. 80, 083505, 2009.
Lin, Q.; Yang, B.; Li, J.; Meng, X.; Shen, J. Polymer2000, 41, 8305-8309.
International Search Report of PCT Application No. PCT/FR2015/053628, dated Mar. 18, 2016, 5 pages.

\* cited by examiner

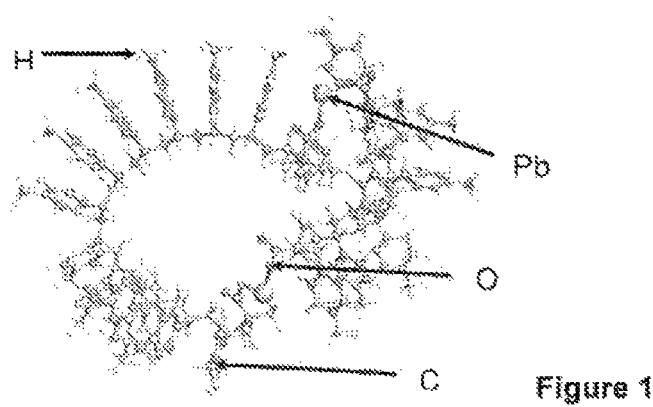
Figure 1
Figure 2a
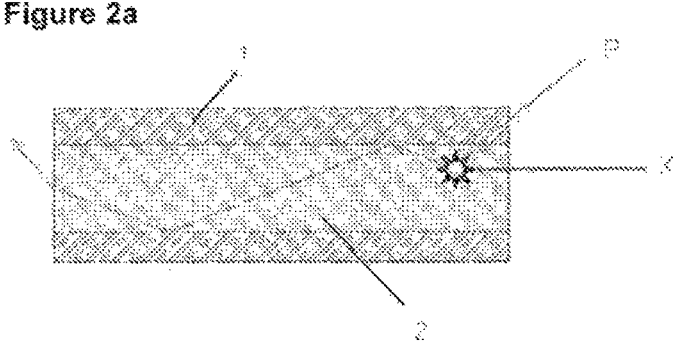
Figure 3a
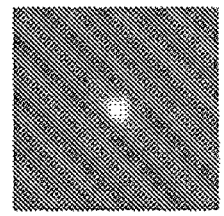
Figure 2b
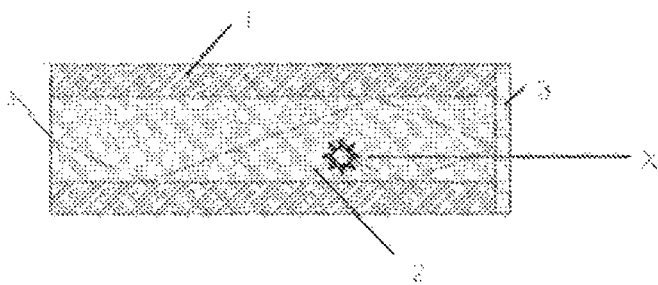
Figure 3b
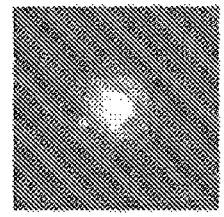

Figure 2c
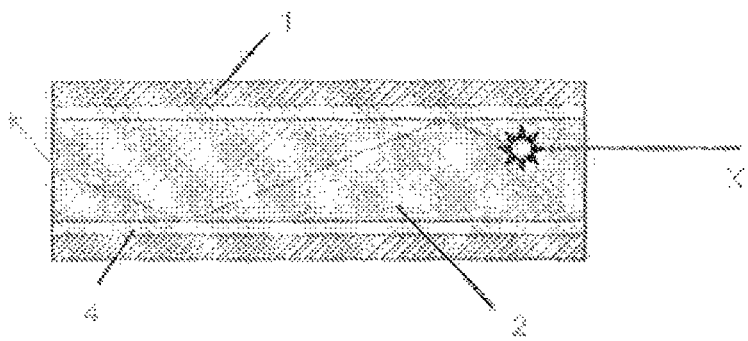
Figure 3c
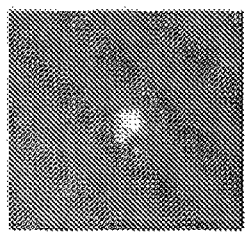
Figure 2d
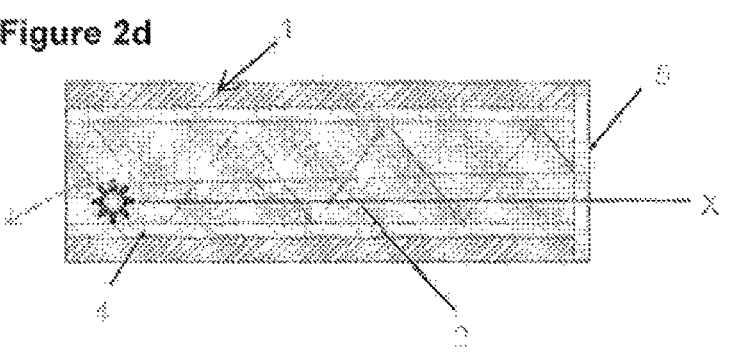
Figure 3d
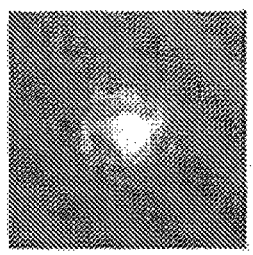
Figure 3e
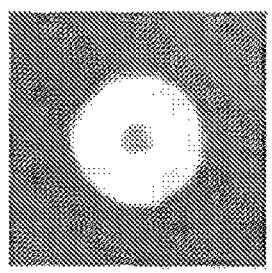
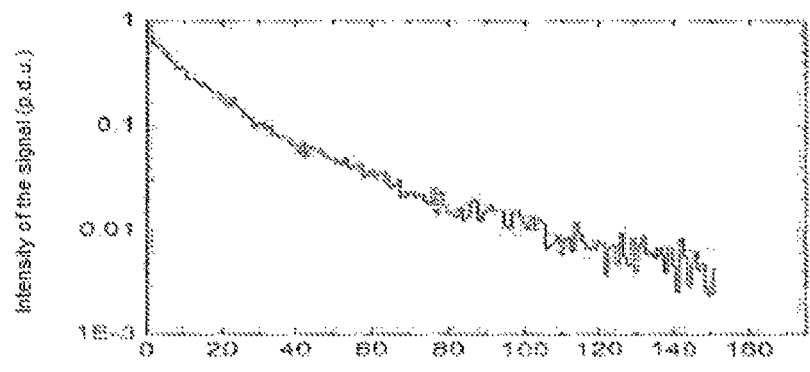
Figure 4

LEAD-LOADED STRUCTURED SOLID ORGANIC SCINTILLATOR

Technical Field

The invention relates to a plastic (i.e. organic) lead-loaded, structured scintillator for imaging using X- or gamma-rays or charged particles. It thus applies to imaging using ionizing radiation; X-, gamma-, beta-rays; protons, electrons, ions.

It finds application in numerous fields such as non-destructive testing, medical imaging (radiography, gamma radiography, protonography, tomography), security (radiographic inspection of packages for example). The invention can also be utilized in spectrometry for characterizing the energy of the ionizing radiation originating from a radiation source.

The scintillator is called structured in the sense that the plastic material that it comprises is distributed within capillaries.

Background

Within the field of imaging, the role of the scintillator is to convert ionizing radiation into visible light radiation. In order to produce a good-quality imaging device, two opposing parameters must be optimized:

The detection threshold, which requires the thickness of the scintillator to be maximized in order to increase the probability of interaction of the radiation with the scintillator and therefore the light yield of conversion;

The spatial resolution which, for its part, requires the thickness of the scintillator to be minimized in order to limit the diffusion of the visible light, because luminescence is an isotropic phenomenon.

A further parameter is the rate of scintillation decay; the lower the rate, the easier it is to follow rapid phenomena.

In practice, the material constituting a scintillator must be transparent, and emit as far as possible in the visible region, preferably above 500 nanometers; the most important is for the scintillator to emit radiation that is compatible with a detector with which it is arranged to be associated.

Two broad families of scintillators are known, according to whether the material of which they are constituted is inorganic or organic.

Within the field of ionizing radiation, the majority of commercial scintillators are mass single-piece inorganic crystals such as for example bismuth germanate (BGO) or cerium-doped yttrium aluminium garnet (YAG:Ce). As a result of their high density, these scintillators retain a relatively moderate thickness, while ensuring a high probability of interaction.

When it is sought to increase the sensitivity, it is necessary to turn to significant scintillator thicknesses. It is then necessary to use segmentation techniques in order to retain a satisfactory spatial resolution (the scintillator is known as "segmented" or "structured"). The scintillator is then constituted by a multitude of fibres, having for example a parallelepipedal cross section, the length of which is much greater than the other dimensions. These fibres are bonded together and optically isolated, oriented in such a way that the incident radiation arrives parallel to the largest dimension of the needles. In this case, the degradation of spatial resolution is limited because the light produced in each fibre cannot propagate into the adjacent fibres. Typically, the fibres have a length of the order of a centimeter and the other dimensions are at least several hundreds of micrometers.

However, this segmentation technique is extremely expensive and can only be applied to certain materials the crystal growth of which can be controlled.

Moreover, inorganic scintillators, due to their crystalline structure, have a response time that is too long for some applications. In fact, the response time of these materials is in the great majority of cases greatly exceeds 10 ns, which is incompatible with some uses, in particular in ultrafast laser X-ray imaging.

As regards the organic scintillators, they have been used for a long time for ionizing radiation imaging. Reference may be made in particular to U.S. Pat. No. 4,495,084, (or its equivalent French Pat. No. FR 2 511 387), or to European Patent Application No. EP 0 913 448 or to PCT Pub. No. WO 2014/135640. To the extent that the interception of the radiation often induces a scintillation at low wavelengths, it is known to incorporate molecules, called fluorophores, having the effect of converting the radiation resulting from the scintillation into radiation of longer wavelength, situated within the visible region.

Nevertheless, with ionizing radiation, these organic scintillators have a lower probability of interaction than the inorganic scintillators, due to the low atomic number Z of the organic components. In order to overcome this difficulty, two broad techniques are used:

Filling a capillary matrix with the scintillation material, having the effect of reducing the light dispersion and allowing the use of large scintillator thicknesses, or Adding a high-Z material to the scintillation material in order to increase the density thereof.

Among the capillary scintillators there may be mentioned for example, filling a matrix of glass capillaries with a liquid scintillation material as described in PCT Pub. No. WO 03/081279; these are for example capillaries the inner diameter of which is less than or equal to 50 micrometers, for example equal to 20 micrometers; with regard to the scintillation liquid, it contains a large fraction of deuterium. Nevertheless, its exploitation is difficult and complicated, because it is necessary to ensure that the liquid is confined, in particular under vacuum, which involves the use of a transparent confining material in order to allow the light to exit, which has the double drawback of increasing the number of optical interfaces (and consequently increasing the transmission losses, which is detrimental to the signal to be detected) and preventing any thermal expansion of the liquid scintillator (which increases the internal pressure in the capillaries and can lead to the destruction of the matrix).

Mention may also be made of filling a matrix of glass capillaries with a monomer and a neutron-absorbing material followed by a polymerization process; a first attempt was proposed in 1985, in E. Bigler, F. Ploack, Applied Optics, Vol.24, N°7, 994-997; more recently it was proposed in U.S. Pat. No. 7,372,041 to fill capillaries of a plastic material or of glass having a diameter comprised between 10 and 200 micrometers with an organic polymer such as polystyrene or polyvinyltoluene, doped with a small percentage- of Li, B, Sm, Cd, Eu, Gd or Dy, optionally also containing fluorophores. But this solution is limited to the detection of the neutrons and does not apply to ionizing radiation imaging.

It should be noted that the formation of a structured organic scintillator, comprising a network of small-diameter capillaries, involves in practice being able to form a homogeneous mixture in a mould in which pressure is reduced so as to force the mixture to penetrate into the capillaries by suction; these moulds are therefore more complex than those in which monolithic scintillators are formed, which can be used at atmospheric pressure. It is understood that this penetration is made easier, the more homogeneous the viscosity, and the mixture, with the proviso that it is advantageous to be able to make this mixture and to force its penetration into the capillaries at ambient temperature, and not in an enclosure at a controlled temperature above said ambient temperature. Then, polymerization of the mixture is induced, which is carried out in practice by increasing the temperature; it is self-evident that the operations of mixing and forced penetration of the mixture must not be carried out at a temperature at which polymerization of the mixture can take place.

The other option consisting of adding a high-Z material, such as lead, in an organic scintillator has been known since the 1950s, (Pichat, L., Pesteil, P., Clément, J. J., Chim. Phys. 1953, 50, 26-41 and Lin, Q.; Yang, B.; Li, J.; Meng, X.; Shen, J. Polymer2000, 41, 8305-8309). This improves the interaction with the radiation and therefore the sensitivity of the scintillator. Nevertheless, high-Z materials can only be incorporated at low percentages and homogeneity of the mixture is very difficult to obtain, due to the precipitation phenomena observed with molecules containing heavy elements. More recently, some authors (M. Hamel, G. Turk, A. Rousseau, S. Darbon, C. Reverdin, S. Normand, Nucl. Instr. and Meth.A 660 (2011) 57-63 and PCT Pub. No. WO 2012085004 to M. Hamel, S. Darbon, S. Normand, G. Turk, 2012) have shown that, by using an organometallic compound called lead dimethacrylate as a cross-linking agent of vinyltoluene, and methacrylic acid, it was possible to reach a high level of incorporation of the lead, ranging up to 12.3% (with 2-hydroxyethyl methacrylate instead of methacrylic acid, it was even possible to obtain 29%). An important aspect is that the lead atom is grafted directly onto the polymer chain, which ensures that a homogeneous distribution thereof is maintained as soon as the cross-linking begins, and avoids an accumulation by precipitation (PCT Pub. No. WO 2012085004 to M. Hamel, S. Darbon, S. Normand, G. Turk, 2012). These authors add fluorophores to the scintillating organic material in order to shift the light emission to wavelengths suitable for the image sensor.

Technical Problem

It is understood that it would be beneficial to manage to combine the advantages of these two techniques within an organic scintillator, i.e. to combine the high density of the high-Z organic scintillators with the ability to have high thicknesses without detracting from the spatial resolution, all without needing to implement complex and expensive production steps.

It has been noted however that to date, the aforementioned two techniques appear to be incompatible, in view of the difficulty in obtaining, at ambient temperature, homogeneous mixtures with heavy compounds such as lead compounds, which tend to precipitate to the bottom of the mould before it has been possible to initiate cross-linking; in other words forcing the mixture to penetrate into the capillaries while keeping the molecules loaded with lead in a regular distribution in this mixture has not been achieved.

In particular, attempts made to date to obtain an organic scintillator formed from a network of capillaries filled with a material loaded with a high-Z element have been unsuccessful, in particular due to the low solubility of lead dimethacrylate in the monomers suitable for the preparation of a capillary scintillator, which has the drawback of resulting in a precipitation in the lower part of the mould and even blocking of the capillaries.

Summary

A subject of the invention is a structured organic scintillator with lead, the preparation of which can be carried out at ambient temperature, formed from capillaries filled homogeneously with a polymer material comprising a high lead fraction, while still being transparent and advantageously having a sufficiently low scintillation decay time to permit ionizing radiation imaging (typically at most 20 ns).

The invention proposes for this purpose a scintillator for imaging using X- or gamma-rays or charged particles, comprising a network of glass capillaries having an inner diameter at most equal to 500 micrometers, these capillaries being filled with a polymer material formed from at least (i) a monomer selected from the group constituted by vinyltoluene, styrene and vinylxylene and their isomers, (ii) a cross-linking agent constituted by a dimethacrylate having a central chain comprising between 1 and 12 carbon atoms, and (iii) lead dimethacrylate, the cross-linking agent being present in a percentage by weight from 17% to 60% of its mixture with the monomer and the lead dimethacrylate being present at at least 5% by weight, the cross-linking agent being present in a proportion of 1.75 to 2.25 times the content by weight of lead dimethacrylate.

It should be noted that this is a solid organic scintillator, heavily loaded with lead and incorporated into glass capillaries, formed from a mixture that can be prepared and incorporated inside capillaries at ambient temperature, while ensuring a good distribution of the lead in the cross-linked matrix.

It is noteworthy that it has already been known per se since the 1980s (U.S. Pat. No. 4,495,084) to produce organic scintillators from vinyltoluene or styrene in combination with, in particular, alkyl methacrylates having from 1 to 4 carbon atoms; but it was not envisaged for such polymers to be loaded with a heavy element such as lead and that they could be incorporated inside capillaries.

More recently polymers have been known, in particular according to the aforementioned PCT Pub. No. WO 2012085004 to M. Hamel, S. Darbon, S. Normand, G. Turk, 2012, that are formed based on vinyltoluene, styrene, vinylxylene in combination with methacrylic acid and a cross-linking agent constituted by lead dimethacrylate; but it was not envisaged that such polymers could be incorporated inside capillaries. In fact, the mixtures proposed by this document appeared not to be compatible with incorporation within a network of capillaries; indeed, the presence of methacrylic acid apparently had a very aggressive effect on the installation comprising the mould required to receive the mixture and the capillaries, in particular on the seals thereof. As regards the mixture of 2-hydroxyethyl methacrylate and lead dimethacrylate also mentioned in this document, although it does not contain methacrylic acid, it was apparently not suitable, due in particular to the precipitation phenomena observed with this lead dimethacrylate at ambient temperature.

Even more recently, plastic scintillation materials are known from PCT Pub. No. WO 2014135640 that are formed from styrene, vinyltoluene or vinylxylene (or their isomers) in combination with a cross-linking agent suitable for promoting rapid and complete cross-linking, such as 1,4 butanediyl dimethacrylate (recommended because it has a low shrinkage factor), which is a dimethacrylate having a central chain with 4 carbon atoms, and fluorophores. Nevertheless, this document did not envisage the incorporation of lead-based organometallic compounds (at most it envisaged doping the polymer with boron), nor, a fortiori, the difficulties that could arise when utilizing the polymer material within a network of capillaries. It is noteworthy that this document is positioned within a different context to that of the invention, since it involves in particular enabling the production of scintillators in large volumes (structuring by means of capillaries does not then seem useful), with a view to the ability to distinguish between neutrons and gamma rays, by means of the utilization of boron which, with its low Z, is an opposite choice to that of lead.

Contrary to what might be assumed a priori with respect to the choice of a dimethacrylate having a central chain comprising between 1 and 12 carbon atoms, the latter appeared not to give rise to a problem of solubility in the mixture (contrary to what may have been noted with other dimethacrylates); in fact, not only did it not give rise to a problem of solubility per se, but moreover, it appeared to have the effect of increasing the solubility of the lead dimethacrylate in the mixture, hence obtaining, after cross-linking, a regular distribution of the lead in the mixture inside the capillaries, even when their diameter is at most equal to 100 or preferably 50 micrometers, or even at most equal to 20 micrometers. After polymerization, the matrix of the scintillator comprises inside the capillaries a polymer in which the lead is incorporated into the polymer chain, in a substantially regular distribution.

Advantageously, the cross-linking agent selected from the dimethacrylates having a central chain comprising between 1 and 12 carbon atoms is 1,4 butanediyl dimethacrylate. In a variant, this may be 1,2 ethylene glycidyl dimethacrylate, or 1,6 hexanediyl dimethacrylate, in particular.

Advantageously, the material comprises the monomer and the cross-linking agent in quantities by weight the ratio of which is comprised between 0.5 and 1.5. Preferably, this ratio is comprised between 0.9 and 1.1.

Also advantageously, the cross-linking agent and the lead dimethacrylate are in quantities by weight the ratio of which is comprised between 1.9 and 2.1.

Advantageously, the material of the scintillator comprises the element Pb at at least 10% by weight, which contributes a significant high-Z effect.

Advantageously, the material also comprises at least one fluorophore capable of generating light within the visible spectrum; this can be primary, secondary or tertiary fluorophores according to the usual nomenclature.

The principle of incorporating fluorophores into an organic scintillator is known per se, in particular according to PCT Pub. No. WO 2012085004 to M. Hamel, S. Darbon, S. Normand, G. Turk, 2012 in which it is proposed to incorporate high-Z chemical elements in combination with compounds suitable for raising the wavelength above 550 nm, in one or more reactions, i.e. there can be a first fluorophore (primary fluorophore) that reacts to UV radiation by emitting photons in the red region, and a second fluorophore (secondary fluorophore) that reacts to these photons by emitting a visible light of a higher wavelength, or even a third fluorophore (tertiary fluorophore) that reacts to this visible light by emitting above the aforementioned threshold. Useful results were obtained with a 1,8-naphthalimide compound and bis-N-(2,5-di-t-butylphenyl)-3,4,9,10-perylenetetracarbodiimide. European Pat. Pub. No. EP—0, 913,448 and PCT Pub. No. WO 2014135640 may also be mentioned; however, it is not envisaged to incorporate such a mixture, comprising such fluorophores, into capillaries.

From a structural point of view, the scintillator of the invention advantageously has a face intended to be placed opposite an X- or gamma- or charged-particle ray, which is provided with a reflective coating suitable for sending light towards the other face.

According to another advantageous option, a face intended to be placed opposite an X- or gamma- or charged-particle ray is provided with a light-scattering coating suitable for sending light towards the other face.

Advantageously, the capillaries are coated internally with a reflective material.

The inner diameter of the capillaries is advantageously at most equal to 100, or even 50 micrometers, or preferably 20 micrometers, or even 10 micrometers, which makes it possible to obtain a very good spatial resolution.

BRIEF DESCRIPTION OF THE DRAWING

Subjects of the invention will become apparent from the following description, given by way of non-limitative illustrative example, in the light of the attached drawings in which:

FIG. 1 is a representation of polyvinyltoluene polymer chains cross-linked by lead dimethacrylate, FIG. 2a is a diagram of a bare capillary, FIG. 2b is a diagram of a capillary provided with a reflective coating on the rear face, FIG. 2c is a diagram of a capillary the inner surface of which comprises a reflective coating, FIG. 2d is a diagram of a capillary combining a reflective coating on the inner wall and a reflective or light-scattering coating on the rear face, FIGS. 3a to 3c are figures showing illuminance corresponding to the capillaries of FIGS. 2a to 2c, FIG. 3d is a figure showing illuminance corresponding to the case of a capillary according to FIG. 2d with a reflective coating, FIG. 3e is a figure showing illuminance corresponding to the case of a capillary according to FIG. 2d with a light-scattering coating, and FIG. 4 is a graph showing the signal decay (in arbitrary units) emitted as a function of time.

DETAILED DESCRIPTION

In general, the invention consists of producing structured organic scintillators from a mixture comprising at least one monomer selected from the following monomers (including their isomers):
Vinyltoluene
Styrene
Vinylxylene
to which is added at least one cross-linking agent formed from 1,4 butanediyl dimethacrylate (or any dimethacrylate having a central chain comprising from 1 to 12 carbon atoms), while respecting the condition that the proportions of cross-linking agent and of monomer are comprised between 17%-60% and 83%-40%, with respect to the mixture of monomers and of constituents. This means that there may be from 17% to 60% of cross-linking agent, with respect to the mixture of monomers and of cross-linking agent.

An effect of 1,4 butanediyl dimethacrylate (and, more generally, of any dimethacrylate having a central chain comprising from 1 to 12 carbon atoms) is that these constituents make it possible to increase the solubility of the lead dimethacrylate in the polymer matrix, which promotes a homogeneous distribution of this organometallic compound in the mixture as well as a low viscosity thereof.

After cross-linking in the presence of a suitable proportion of lead dimethacrylate (in practice at least equal to 5% by weight of the mixture of monomer, cross-linking agent and lead dimethacrylate), an organic scintillator is obtained that combines the advantages of a capillary scintillator and a high-Z scintillator: in fact, this scintillator combines a good spatial resolution and a good sensitivity, without involving a significant thickness, and without the risk of deterioration of the transparency over time.

The content of cross-linking agent is advantageously selected as a function of the lead dimethacrylate content, in practice between 1.75 and 2.25 times this content, preferably between 1.9 and 2.1 times this content, which amounts to saying that, preferably, the content of cross-linking agent is at least approximately equal to double the lead dimethacrylate content.

The best results, in terms of yield and incorporation into the glass capillaries, were obtained from 1,4 butanediyl poly(vinyltoluene-co-dimethacrylate), the structure of which is given in FIG. 1 (therefore from vinyltoluene).

A scintillator of the aforementioned type has an intrinsic light emission in the UV when it is subjected to an ionizing radiation. This is why one option of the invention consists of incorporating fluorophores into the organic material of the scintillator in order to convert the preferential emission in the UV thereof to the red region. This makes it possible to adapt the scintillator to the image sensors such as CCD sensors for example.

The fluorophores used in the invention are preferably derivatives of 1,8-naphthalimide.

Without wishing to be limited thereto, it is noteworthy that particularly useful results have been obtained by using two primary fluorophores, 2,5-diphenyloxazole or biphenyl.

Quite particularly advantageously, the invention utilizes another fluorophore which is either a compound with a structure close to the naphthalim ides (bis-N-(2,5-di-t-butylphenyl)-3,4,9,10-perylenetetracarbodiimide), or Nile Red.

Other fluorophores can be envisaged provided that the energy transfers are carried out from the near UV to the red region with a good quantum efficiency, determined by the overlapping of the successive emission/absorption spectra.

It is noteworthy that the set of fluorophores proposed above make it possible to retain a decay time of the order of approximately ten nanoseconds.

Thus, the invention makes it possible to develop plastic scintillators the wavelength of which is easily adjustable. In other words, it is possible according to the invention to add up to three or even four different fluorophores, which convert the incident radiant energy from the UV to the red region.

To this end it is possible to select:

A first fluorophore (primary fluorophore) that is soluble in the apolar solvents at concentrations comprised between 0.5 and 15% by weight, preferably between 3% and 15% by weight, having a maximum absorption wavelength close to 300 nm and emitting light at around 360 nm, having a quantum efficiency of fluorescence greater than 20% and a luminescence decay constant less than 20 ns;

A second fluorophore (secondary fluorophore) that is soluble in the apolar solvents at concentrations comprised between 0.01 and 4% by weight, having a maximum absorption wavelength close to 360 nm and emitting light at around 420 nm, having a quantum efficiency of fluorescence greater than 40% and a luminescence decay constant less than 20 ns;

A third fluorophore (tertiary fluorophore) that is soluble in the apolar solvents at concentrations comprised between 0.01 and 1% by weight, having a maximum absorption wavelength close to 420 nm and emitting light at around 510 nm, having a quantum efficiency of fluorescence greater than 40% and a luminescence decay constant less than 20 ns;

A fourth fluorophore (quaternary fluorophore) that is soluble in the apolar solvents at concentrations comprised between 0.01 and 1% by weight, having a maximum absorption wavelength close to 510 nm and emitting light at around 590 nm, having a quantum efficiency of fluorescence greater than 40% and a luminescence decay constant less than 20 ns.

The capillary matrix utilized in the invention is made from glass, in practice according to a staggered arrangement, with optional spacers between the capillaries. The utilization of capillaries made from plastic material cannot be envisaged because in the vast majority of cases the glass transition temperature is below 100° C. or very slightly above (with the notable exception of the family of polycarbonates). As the polymerization of the heavy-metal loaded scintillators passes through thermal cycles exceeding 100° C., the integrity of the assembly cannot then be ensured.

The optical index of the heavy-metal loaded organic scintillator is close to 1.57. The index of the glass constituting the cladding must therefore be less than this value in order to ensure guiding according to Snell-Descartes law. As scintillation is intrinsically isotropic, the waveguide thus constituted must have a numerical aperture (the formula of which is provided below) that is as high as possible in order to reduce unguided light losses. To this end, the index of the glass constituting the cladding must be well below that of the index of the scintillating plastic.

$$NA = \sqrt{n_c^2 - n_{cl}^2} \text{ with } \begin{cases} n_c \text{ core index} \\ n_{cl} \text{ cladding index} \end{cases}$$

FIG. 2*a* shows a capillary comprising a glass tube 1 (the index n is substantially equal to 1.47) and a polymerized material 2 (in the case in question, its index n was 1.57); an X-ray coming from the right is intercepted there within the material, at a site denoted by the arrow P, so as to generate a photon flowing towards the left, while being reflected off the inner surface of the capillary.

According to an advantageous feature of the invention, a reflective layer 3 is added on the face of the scintillator which, being perpendicular to the capillary matrix, is in direct view of the ionizing radiation; this makes it possible to recover the light propagating in the opposite direction to the X-ray (see FIG. 2*b*, in comparison with the basic configuration in FIG. 2*a*).

According to another advantageous feature of the invention, between the capillaries or along their inner surface a material (not shown) is added, absorbing the visible light in order to reduce the cross-talk between waveguides. As the scintillation is isotropic, while the waveguide constituted by the scintillating core and the glass cladding has a limited acceptance angle, the addition of the absorbant also reduces unguided stray light, thereby improving the spatial resolution.

According to yet another variant, a reflective metallic deposit 4 is formed on the inner walls of the glass capillaries (see FIG. 2c). In fact, while the previous versions lose over 50% of the light signal due to the limited acceptance angle of the step-index waveguide, the addition of the reflective deposit allows the light generated by the scintillator to be guided with a minimum of loss. Nevertheless, due to the scintillator/air interface, a portion of the guided light remains trapped inside the waveguide. In order to recover this light, the inventors propose, moreover, to add a mirror 3 or a light-scattering coating 5 on the rear face of the capillary matrix (see FIG. 2d).

The benefit of the aforementioned additions is apparent from comparison of FIGS. 3a to 3e:
- FIG. 3a shows the illumination map obtained for a waveguide formed from a bare capillary, for a 1W isotropic point source in the middle of the guide, with a linear colour scale from 0 to $7.7 \cdot 10^6$ W/m² (the measured loss was 89%),
- FIG. 3b shows the illumination map obtained under the same conditions, in the case of a capillary equipped with a mirror on the rear face (FIG. 2b); the measured loss was 76%,
- FIG. 3c shows the illumination map obtained under the same conditions, in the case of a capillary the inner surface of which is made reflective (FIG. 2c); the measured loss was 88%,
- FIG. 3d shows the illumination map obtained under the same conditions, in the case of a capillary combining an inner reflective surface and a mirror on the rear face (FIG. 2d); the measured loss was 76%, and
- FIG. 3e shows the illumination map obtained under the same conditions, in the case of a capillary combining an inner reflective surface and a light-scattering coating on the rear face (FIG. 2d); the measured loss was 14%.

It is noteworthy that, in comparison with the case of a bare capillary, the presence of a reflective coating on the inside of the capillary has practically no effect (it seems that, in the case in question, the inner surface of the capillary already had a significant reflective effect). The presence of a mirror on the rear face has a positive effect; on the other hand, surprisingly, the losses are significantly reduced by placing a scatter material on the rear face.

By way of example, an organic scintillator is produced from a poly(vinyltoluene)-poly(1,4-butanediyle dimethacrylate) mixture cross-linked by a determined proportion of lead dimethacrylate; the glass used for the glass capillaries (reference 8250 from the manufacturer Schott) has an optical index of 1.57. The numerical aperture of the bundle of scintillating fibres then creates a numerical aperture of 0.52 corresponding to an angle of 31.6°. The glass capillaries have an inner diameter of at most 100 µm, or even less than 50 µm, or even at most equal to 20 or even 10 µm. In order to avoid too large an inhomogeneity of illumination of the scintillator, a strict control of the thickness of the glass (difference between outer/inner diameter) and of the glass index was carried out. In fact, a wide divergence of this thickness leads to significant fluctuations in density and index between capillaries.

Fluorophores are incorporated in order to maximize the fluorescence intensity under X-rays. The best scintillation yields were obtained for weight percentages of lead close to 10%.

A particular example of composition is given below, at the rate of 10% Pb:

| | |
|---|---|
| % by weight of vinyltoluene | 40 |
| % by weight of 1,4 butanediyl dimethacrylate | 40 |

-continued

| | |
|---|---|
| % by weight of lead dimethacrylate | 20 |
| % by weight of lead | 10 |
| % by weight of PPO | 3 |
| % by weight of N-(2',5'-di-t-butylphenyl)-4-butylamino-1,8-naphthalimide | 0.3 |
| % by weight of bis-N-(2',5'-di-t-butylphenyl)-3,4,9,10-perylenetetracarbodiimide | 0.02 |
| λ absorption (nm) | <500 |
| λ max fluorescence (nm) | 580 |
| Decay time (ns) | 6 |

The contents are given with reference to the mixture of the first three constituents; the monomer and the cross-linking agent are present here in equal quantities by weight, while the cross-linking agent has a content by weight double that of the lead dimethacrylate.

Similar proportions can be utilized for a mixture of styrene (or of vinylxylene) with 1,4 butanediyl dimethacrylate (or another dimethacrylate having a central chain comprising from 1 to 12 carbon atoms) while achieving satisfactory results.

Preferably, the scintillator of the invention has a maximum emission towards wavelengths above 570 nm. By way of example, the fluorescent compounds incorporated into the scintillators studied are derivatives of 1,8-naphthalimides, perylene carbodiimides and Nile Red.

In a simplified version of the invention, it is possible to prepare scintillators fluorescing in any visible wavelength range whatsoever.

By way of example, in order to produce a lead scintillator defined above, pure 1,4 butanediyl dimethacrylate, pure vinyltoluene, lead dimethacrylate, N-(2',5'-di-t-butylphenyl)-4-butylamino-1,8-naphthalimide, bis-N-(2',5'-di-t-butylphenyl)-3,4,9,10-perylenetetracarbodiimide and 2,5-diphenyloxazole are mixed under inert atmosphere in a dry flask. The mixture is fully degassed using the method known as "freeze-pump-thaw", then it is poured carefully into a mould having the dimensions of the capillary matrix, which will give the final form of the scintillator.

The capillary matrix, the inner diameter of which is a few tens of micrometers (at most 20, or even 10 micrometers), is then introduced into the mould so that the liquid forcibly enters the spaces left free in the glass matrix over a length of several centimeters.

The preparation of the mixture, its introduction into the mould, then the introduction of the capillary matrix are carried out at ambient temperature, a temperature at which good solubilization of the lead dimethacrylate is ensured.

After a heat cycle adapted to shaping the scintillator and allowing all the monomers to polymerize, the product is removed from the mould, then polished until a surface condition is obtained that is compatible with imaging applications. The dimensions of the scintillator are, for example, 40 mm in length and width (perpendicularly to the length of the capillaries) and 5 mm thick (parallel to these capillaries). The main emission wavelength is 580 nm.

FIG. 4 represents a time-resolved measurement of the spectrum for an excitation of the scintillator at 330 nm, expressing a measurement of the decay time of the scintillator. The decay profile over time at the wavelength of interest is measured then approximated by a single or double decreasing exponential function. The decay time is then defined as the time constant of the first exponential function.

The invention claimed is:

1. A scintillator for imaging using X-rays or gamma-rays or charged particles, the scintillator comprising,
   a network of glass capillaries having an inner diameter at least equal to 500 micrometers, the capillaries filled with a polymer material comprising at least,
   (i) a monomer selected from the group constituted by vinyltoluene, styrene and vinylxylene and their isomers,
   (ii) a cross-linking agent constituted by a dimethacrylate having a central chain comprising between 1 and 12 carbon atoms, and
   (iii) lead dimethacrylate,
   wherein the polymer material includes 17 wt. % to 60 wt. % cross-linking agent in combination with the monomer, and at least 5 wt. % lead dimethacrylate, and a proportion of the cross-linking agent is 1.75 to 2.25 times the content by weight of lead dimethacrylate.

2. The scintillator according to claim 1, wherein the cross-linking agent is 1,4 butanediyl dimethacrylate.

3. The scintillator according to claim 1, wherein the polymer material comprises the monomer and the cross-linking agent in a weight ratio of between 0.5 and 1.5.

4. The scintillator according to claim 3, wherein the polymer material comprises the monomer and the cross-linking agent in a weight ratio of between 0.9 and 1.1.

5. The scintillator according to claim 1, wherein polymer material comprises the cross-linking agent and the lead dimethacrylate in a weight ratio of between 1.9 and 2.1.

6. The scintillator according to claim 1, the polymer material further comprises at least 10% by weight Pb.

7. The scintillator according to claim 1, wherein the polymer material further comprises at least one fluorophore capable of generating light within the visible spectrum.

8. The scintillator according to claim 1, wherein a face of the scintillator opposite an X-ray or gamma-ray or charged-particle ray includes a reflective coating suitable for reflecting light towards the other face.

9. The scintillator according to claim 1, wherein a face of the scintillator opposite an X-ray or gamma-ray or charged-particle ray includes a light-scattering coating suitable for sending light towards the other face.

10. The scintillator according to claim 8, wherein the capillaries include an internal coating of a reflective material.

11. The scintillator according to claim 1, wherein the capillaries have an inner diameter no more than 20 micrometers.

12. The scintillator according to claim 9, wherein the capillaries include an internal coating of a reflective material.

* * * * *